(12) United States Patent
Zhou et al.

(10) Patent No.: US 10,944,824 B2
(45) Date of Patent: Mar. 9, 2021

(54) METHOD AND APPARATUS FOR PROCESSING MEDIA TYPE IN REST SOFTWARE ARCHITECTURE

(71) Applicant: EMC IP Holding Company LLC, Hopkinton, MA (US)

(72) Inventors: Wei William Zhou, Shanghai (CN); Chen Wang, Shanghai (CN); Wei Ruan, Shanghai (CN); Jason Muhua Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 278 days.

(21) Appl. No.: 15/269,220

(22) Filed: Sep. 19, 2016

(65) Prior Publication Data

US 2017/0085646 A1    Mar. 23, 2017

(30) Foreign Application Priority Data

Sep. 23, 2015   (CN) .................. 201510614150.6

(51) Int. Cl.
*H04L 29/08* (2006.01)
*G06F 8/00* (2018.01)
*G06F 8/65* (2018.01)

(52) U.S. Cl.
CPC ............ *H04L 67/1097* (2013.01); *G06F 8/00* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 8,745,641 B1* | 6/2014 | Coker | G06F 11/3668 719/313 |
| 2006/0150200 A1* | 7/2006 | Cohen | G06F 9/547 719/328 |
| 2007/0226306 A1* | 9/2007 | Cesarini | G06Q 30/04 709/206 |
| 2010/0083277 A1* | 4/2010 | Malladi | G06F 9/541 719/313 |

(Continued)

FOREIGN PATENT DOCUMENTS

| CN | 1783019 | 6/2006 |
|---|---|---|
| CN | 101536458 | 9/2009 |

(Continued)

*Primary Examiner* — Aaron N Strange
*Assistant Examiner* — Mohammad Yousuf A. Mian
(74) *Attorney, Agent, or Firm* — BainwoodHuang

(57) ABSTRACT

Embodiments of the present disclosure provide a method and apparatus for processing a media type in representational state transfer (REST) software architecture, comprising: extracting, in a request from a client, a first media type for the request, the request including a message sent to a server; in response to determining that a first media type processor supporting the first media type exists, converting, by the first media type processor, the message into an instance of a first data model; and sending the instance of the first data model to the server. Embodiments of the present disclosure can add support to a new media type without a need of changing the existing data model, thereby enhancing development efficiency of web applications.

14 Claims, 6 Drawing Sheets

(56) References Cited

U.S. PATENT DOCUMENTS

| | | | |
|---|---|---|---|
| 2014/0325337 A1* | 10/2014 | McWeeney | G06F 17/30893 |
| | | | 715/234 |
| 2016/0062739 A1* | 3/2016 | Kaulgud | G06F 8/20 |
| | | | 717/107 |
| 2016/0226946 A1* | 8/2016 | Karaatanassov | H04L 67/02 |
| 2017/0111220 A1* | 4/2017 | Kumar | H04L 47/70 |

FOREIGN PATENT DOCUMENTS

| | | |
|---|---|---|
| CN | 101617311 | 12/2009 |
| CN | 104049991 | 9/2014 |

* cited by examiner

METHOD AND APPARATUS FOR PROCESSING MEDIA TYPE IN REST SOFTWARE ARCHITECTURE

RELATED APPLICATION

This application claim priority from Chinese Patent Application Number CN201510614150.6, filed on Sep. 23, 2015 at the State Intellectual Property Office, China, titled "METHOD AND APPARATUS FOR PROCESSING A MEDIA TYPE IN REST SOFTWARE ARCHITECTURE," the contents of which is herein incorporated by reference in its entirety.

FIELD OF THE INVENTION

Embodiments of the present disclosure generally relate to web applications and services, and more specifically, to a method and apparatus for processing a media type in representational state transfer (REST) software architecture.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY OF THE INVENTION

Embodiments of the present disclosure are to provide a method and apparatus for processing a media type in representational state transfer (REST) software architecture, so as to solve the above problems.

According to one aspect of the present invention, there is provided a method for processing a media type in representational state transfer (REST) software architecture, comprising: extracting, in a request from a client, a first media type for the request, the request including a message sent to a server; in response to determining that a first media type processor supporting the first media type exists, converting the message into an instance of a first data model by the first media type processor; and sending the instance of the first data model to the server.

BRIEF DESCRIPTION OF THE ACCOMPANYING DRAWINGS

The above and other objectives, features and advantages of the embodiments of the present disclosure will become easily understood by reading the detailed depiction below with reference to the accompanying drawings. Several embodiments of the present disclosure are illustrated in an exemplary, but not limitative, manner in the drawings, in which.

In respective drawings, same or corresponding reference numerals represent same or corresponding parts.

DETAILED DESCRIPTION OF THE PREFERRED EMBODIMENTS

Figure 1:
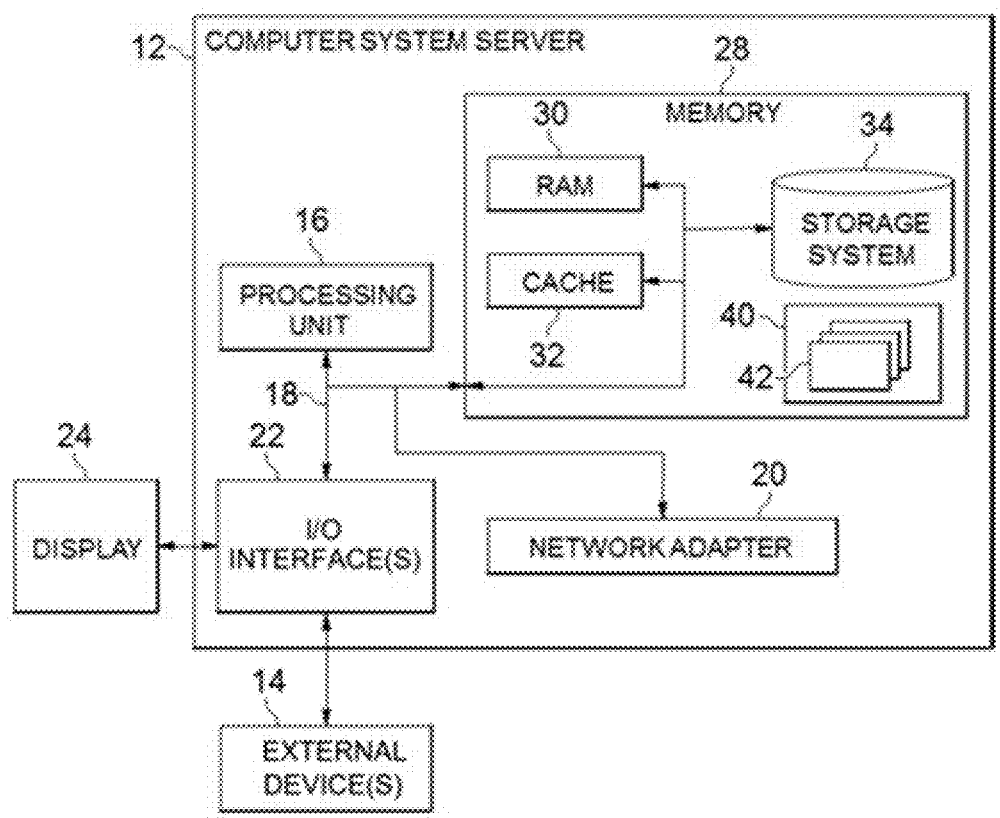
FIG. 1 shows a block diagram of an exemplary computer system/server 12 adapted to implement the embodiments of the present disclosure.

Hereinafter, the principle of the present disclosure will be described with reference to several exemplary embodiments shown in the drawings. It should be noted that these embodiments are described only for enabling those skilled in the art to better understand and then further implement the present disclosure, not intended to limit the scope of the present disclosure in any manner.

Typically, REST refers to software architecture with a set of design constraints. Generally, an application programming interface (API) that accesses a RESTful application or service is referred to as a RESTful API or REST API. RESTful APIs have become a dominant API type in current web API types. For a RESTful API, a media type defines syntax and semantics for a client and a server to exchange messages (which are also referred to representations). For example, most RESTful APIs support a representation in an Extensive Markup Language (XML) format or a representation in a Javascript Object Notation (JSON) format.

However, typically, even for representations in JSON format, there exist considerable open media types (e.g., Siren, HAL, Masan, Uber, etc.) and customized media types that are not open to users. Generally, these media types are somewhat different in markup, e.g., the way to present a link relationship, the way to present attributes, etc. Typically, this causes inconveniences to designing a new web API or converting a legacy system into a REST architecture. Generally, as it is hard to select a specific media type, it is also hard to map an existing business data model into the specific media type representation.

In addition, conventionally, a web application usually has its own data model. Generally, in order to create RESTful APIs for the application, a specific data binding technology will be often chosen to bind its business data model to a specific media type representation. Typically, when the application is required to support more media types or to convert its media type from one type to another type, the existing data model needs to be changed or a new data model needs to be introduced for binding it to a new media type. Generally, as modification to the data model readily compromises system compatibility, such tight-binding design brings a huge challenge to evolution of an application.

Embodiments of the present disclosure are to provide a method and apparatus for processing a media type in representational state transfer (REST) software architecture, so as to solve the above problems.

According to one aspect of the present invention, there is provided a method for processing a media type in representational state transfer (REST) software architecture, comprising: extracting, in a request from a client, a first media type for the request, the request including a message sent to a server; in response to determining that a first media type processor supporting the first media type exists, converting the message into an instance of a first data model by the first media type processor; and sending the instance of the first data model to the server.

In some embodiments, the method further comprises: extracting, from the request, a second media type specified for a response to the request.

In some embodiments, the method further comprises: receiving, from the server, an instance of a second data model returned to the client; in response to determining that a second media type processor supporting the second media type exists, converting the instance of the second data model into a message by the second media type processor; and sending to the client the response including the message.

In some embodiments, the method further comprises: creating the first data model.

In some embodiments, creating the first data model comprises: marking the first data model with a uniform annotation so as to provide meta-information of the first media type to the first media type processor.

In some embodiments, the uniform annotation comprises at least one of a serializable type, a serializable field, and a serializable entry.

In some embodiment, the method further comprises: creating the first media type processor supporting the first media type.

In some embodiments, creating the first media type processor supporting the first media type comprises: creating a reader so as to enable converting the message of the first media type into the instance of the first data model; and creating a writer so as to enable converting the instance of the first model into the message of the first media type.

In some embodiments, the method further comprises: verifying the first media type processor based on a predetermined rule.

In some embodiments, the method further comprises: configuring the first media type processor to be associated with the first media type such that the first media type processor can process the first media type.

According to another aspect of the present invention, there is provided an apparatus for processing a media type in representational state transfer (REST) software architecture, comprising: a media type extracting module configured to extract, in a request from a client, a first media type for the request, the request including a message sent to a server; a deserializing module configured to, in response to determining that a first media type processor supporting the first media type exists, convert the message into an instance of a first data model by the first media type processor; and a data sending module configured to send the instance of the first data model to the server.

In some embodiments, the media type extracting module is further configured to: extract, from the request, a second media type specified for a response to the request.

In some embodiments, the apparatus further comprises: a data receiving module configured to receive, from the server, an instance of a second data model returned to the client; a serializing module configured to, in response to determining that a second media type processor supporting the second media type exists, convert the instance of the second data model into a message by the second media type processor; and a response sending module configured to send to the client the response including the message.

In some embodiments, the apparatus further comprises: a data model creating module configured to create the first data model.

In some embodiments, the data model creating module is configured to: mark the first data model with a uniform annotation so as to provide meta-information of the first media type to the first media type processor.

In some embodiments, the uniform annotation comprises at least one of a serializable type, a serializable field, and a serializable entry.

In some embodiments, the apparatus further comprises: a media type processor creating module configured to create the first media type processor supporting the first media type.

In some embodiments, the media type processor creating module is configured to: create a reader so as to enable converting the message of the first media type into the instance of the first data model; and create a writer so as to enable converting the instance of the first model into the message of the first media type.

In some embodiments, the apparatus further comprises: a media type processor verifying module configured to verify the first media type processor based on a predetermined rule.

In some embodiments, the apparatus further comprises: a media type processor registering module configured to configure the first media type processor to be associated with the first media type such that the first media type processor can process the first media type.

According to a further aspect of the present disclosure, there is provided a computer program product for processing a media type in representational state transfer (REST) software architecture, the computer program product being tangibly stored on a non-transient computer-readable medium and comprising machine-executable instructions that, when being executed, cause a machine to execute steps of the method.

In embodiments of the present disclosure can add support to new media types without a need of changing the existing data model, thereby enhancing development efficiency of web applications.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
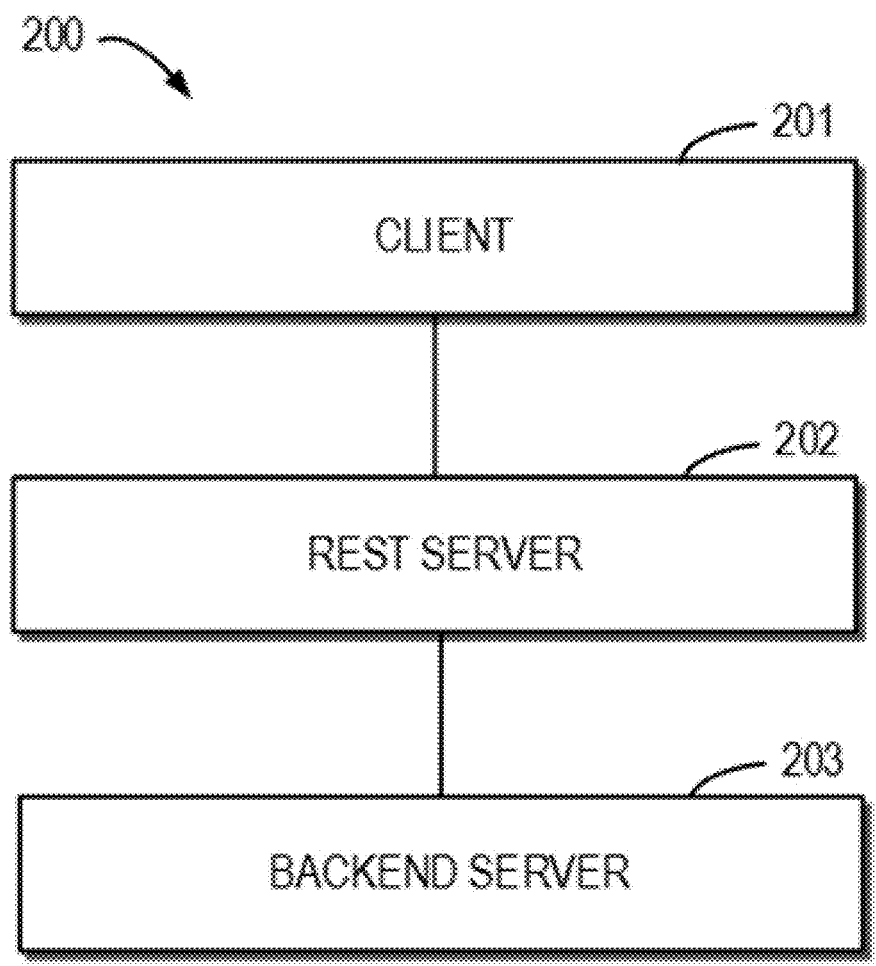
FIG. 2 shows a schematic diagram of an environment 200 for processing a media type in REST software architecture according to an embodiment of the present disclosure.

Now, refer to FIG. 2, in which a schematic diagram of an environment 200 for processing a media type in REST software architecture according to an embodiment of the present disclosure is presented.

As shown in FIG. 2, the environment 200 comprises a client 201, a REST server 202, and a backend server 203. For example, the client 201, REST server 202, and backend server 203 may be implemented by a computer system/server 12 described with reference to FIG. 1. In some embodiments, the user may initiate a REST request to the REST server 202 via the client 201 (e.g., a web page in a web application). Payloads in the REST request may include a message that may be a representation of a certain media type, and a header of the request may specify a media type for requesting the payloads and a media type for responding to the payloads. The REST server 202 deserializes the message into an instance of a data model (e.g., including classes defining specific data objects), and transmits the instance of the data model to the backend server 203 (e.g., a database server) to request for corresponding data. In response to the data request, the backend server 203 returns the requested data to the REST server 202, where the returned data is an instance of a serializable data model. The REST server 202 serializes the instance of the data model into a message, i.e., represented by the media type specified by the header of the REST request for responding to the payloads. Then, a REST response including the message is returned to the client 201.

Figure 3:
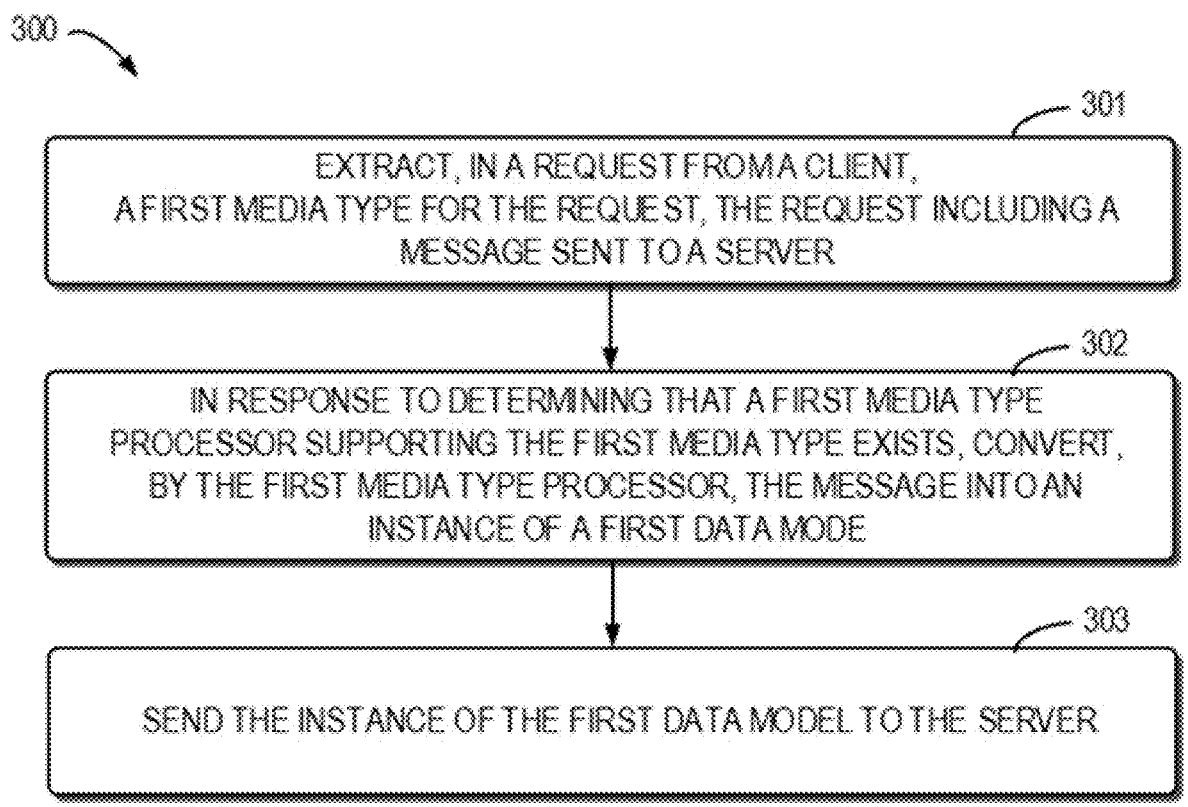
FIG. 3 shows a flow chart of a method 300 for processing a media type in REST software architecture according to an embodiment of the present disclosure.

FIG. 3 shows a flow chart of a method 300 for processing a media type in REST software architecture according to an embodiment of the present disclosure. Hereinafter, respective steps in FIG. 3 will be described with reference to FIG. 2. For example, the method 300 may be carried out by the REST server 202 in FIG. 2.

In step 301, a first media type specified for the request is extracted in a request from a client 201. For example, a header of the REST request specifies a media type for payloads of the request. The payloads of the request may include a message sent to the backend server 203, i.e., a representation of the media type for the requested payloads specified by the header of the REST request. Next, the method 300 proceeds to step 302. In step 302, in response to determining that a first media type processor supporting the first media type exists, the first media type processor converts the message into an instance of a first data model. In some embodiments, the first media type may comprise an XML type (e.g., application/atom+xml) or JSON type (e.g., application/home+json), etc. For example, the first data model may be classes in Java language for defining data objects. It should be understood that the first media type may comprise any existing or future developed media type, and the first data model may also be expressed in any existing or future developed programming language or form. When it is determined that a first media type processor supporting the first media type exists, the first media type processor may deserialize the message into an instance of a first data model. Next, the method proceeds to step 303. In step 303, the instance of the first data model is sent to the backend server 203. Exemplary code 1 below show an example for deserializing representations (i.e., messages) in XML and JSON formats into classes in Java language for defining data objects.

---

Exemplary Code 1

Java Definition

---

```
@SerializableType ("business-object")
public class BusinessObject {
   private String id;
   private Integer vstamp;
   public BusinessObject(String id, Integer vstamp) {
      this.id = id;
      this.vstamp = vstamp;
   }
   // a simplest case
   public static void main(String[ ] args) {
      BusinessObject bo = new BusinessObject("09ae2d", 6);
   }
}
```

XML

---

```
<?xml version='1.0' encoding='UTF-8'?>
<business-object>
   <id>09ae2d</id>
   <vstamp>6</vstamp>
</business-object>
```

JSON

---

```
{
   "id":"09ae2d",
   "vstamp":6
}
```

---

Additionally or alternatively, a second media type specified for a response to the request may also be extracted from the header of the REST request. In some embodiments, for example, the second media type may be identical to the first media type or different from the first media type.

Figure 4:
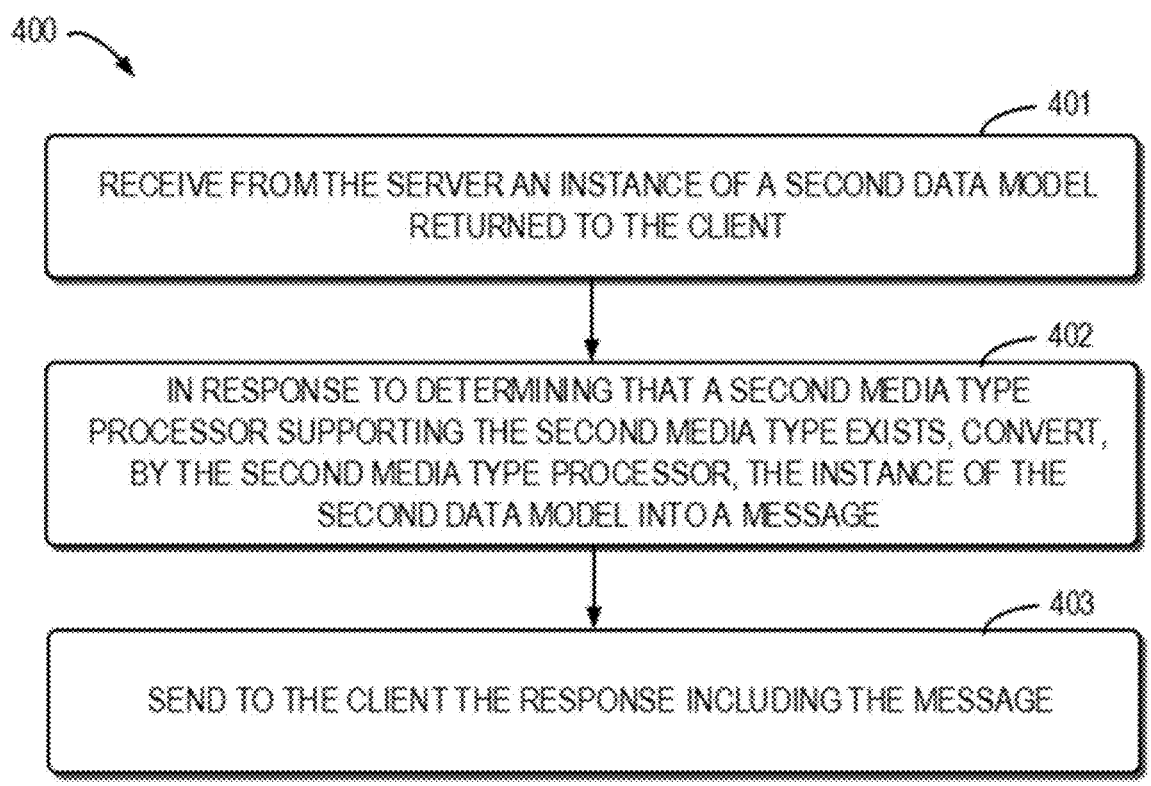
FIG. 4 shows a flow chart of a method 400 for processing a media type in REST software architecture according to an embodiment of the present disclosure.

FIG. 4 shows a flow chart of a method 400 for processing a media type in REST software architecture according to an embodiment of the present disclosure. Hereinafter, respective steps in FIG. 4 will be described with reference to FIG. 2. For example, the method 400 may be carried out by the REST server 202 in FIG. 2.

In step 401, an instance of a second data model returned to the client 201 is received from the backend server 203. For example, the second data model may be classes in Java language for defining data objects. In some embodiments, the second data model may be identical to the first data model or different from the first data model. Next, the method 400 proceeds to step 402, where in response to determining that a second media type processor supporting a second media type exists, the second media type processor may convert the instance of the second data model into a message. As mentioned above, the second media type is the second media type specified for responding to the request, which is extracted from the header of the REST request. In some embodiments, when the second media type is identical to the first media type, the second media type processor is just the first media type processor. In addition, when it is determined that a second media type processor supporting the second media type does not exist, the instance of the second data model may be converted into a message (e.g., a representation in the XML format) by a default media type processor (e.g., a media type processor for the XML type). Next, the method 400 proceeds to step 403. In step 403, a response including the message is sent to the client 201. For example, the message may be included in payloads of the response.

Various methods of processing media types in REST software architecture at run-time have been described above. In addition, in some embodiments, at an initial stage, a new REST data model may be created for a new resource. In some embodiments, creating a serializable data model comprises marking the data model with a uniform annotation so as to provide meta-information for a corresponding media type to the media type processor, wherein the uniform annotation may comprise a serializable type (@SerializableType), a serializable field (@SerializableField), and a serializable entry (@SerializableEntry). The serializable type may be used for marking a class of a data model as a serializable REST representation, e.g., the exemplary code 1 above provides an example of usage of the serializable type. The serializable field may be used for marking a field of a class to be serializable, and this annotation is only used for the field of the class that is marked with the serializable type. The serializable entry may cause a class marked with this annotation to be serialized into a key-value pair. For example, exemplary code 2 and exemplary code 3 provide examples of usage of the serializable field and serializable type, respectively. The media type processor may serialize an instance of a data model into a representation of a corresponding media type using a uniform annotation; in turn, the representation of the media type may be deserialized into the instance of the corresponding data model by searching the uniform annotation in the data model.

---

Exemplary Code 2

Java Definition

---

```
@SerializableType ("business-object")
public class BusinessObject {
   private String id;
   @SerializableField("version-Stamp")
   private Integer vstamp;
   public BusinessObject(String id, Integer vstamp) {
      this.id = id;
      this.vstamp = vstannp;
   }
   // Customize field name
   public static void main(String[ ] args) {
      BusinessObject bo = new BusinessObject("09ae2d", 6);
   }
}
```

XML

---

```
<?xml version='1.0' encoding='UTF-8'?>
<business-object>
   <id>09ae2d</id>
   <version-stamp>6</version-stamp>
</business-object>
```

JSON

---

```
{
   "id":"09ae2d",
   "version-stamp":6
}
```

---

Exemplary Code 3

Java Definition

---

```
@SerializableType ("business-object")
public class BusinessObject {
   private String id;
   private Integer vstamp;
   private List<Attribute> attributes;
   public BusinessObject(String id, Integer vstamp, Attribute[ ] attributes)
   {
```

-continued

Exemplary Code 3

```
    this.id = id;
    this.vstamp = vstamp;
    this.attributes = attributes == null ? new ArrayList<Attribute>( ) :
Arrays.asList(attributes);
    }
    @SerializableEntry(key = "name", value = "value")
    public static class Attribute {
        private String name;
        private Object value;
        public Attribute (String name, Object value) {
            this.name = name;
            this.value = value;
        }
    }
    // entry key and value
    public static void main(String[ ] args) {
        BusinessObject bo = new BusinessObject("09ae2d", 6,
            new Attribute[ ] {
                new Attribute ("object_name", "readme"),
                new Attribute("title", readme file")});
    }
}
```

XML

```
<?xml version='1.0'encoding='UTF-8'?>
<business-object>
    <id>09ae2d</id>
    <vstamp>6</vstamp>
    <attributes>
        <object_name>readme</object_name>
        <title>readme file</title>
    </attributes>
</business-object>
```

JSON

```
{
    "id":"09ae2d",
    "vstamp":6
    "attributes":
    {
        "object_name":"readme",
        "title":"readme file"
    }
}
```

Additionally or alternatively, after creating a new REST data model, the created data model may be verified based on a predetermined rule. For example, the predetermined rule may be customized through XML configurations; and for each class in the data model, it is verified whether it conforms to a specified rule. Besides, preview may be performed on the created data model, and the created data model may be packed into a REST application for being used.

In some embodiments, a media type processor for processing a media type (e.g., the first media type or the second media type, or a new media type, etc.) may be created. For the sake of simplification, a method for creating the first media type processor supporting the first media type will be illustrated with the first media type as an example. For example, FIG. 5 shows a flow diagram of a method 500 for creating a media type processor according to an embodiment of the present disclosure.

In step 501, a first media type processor supporting a first media type is created. In some embodiments, creating the first media type processor comprises creating a reader for receiving a message and converting it into an instance of a corresponding data model. Creating the first media type processor further comprises creating a writer for receiving an instance of a data model and converting it into a corresponding message. Next, the method 500 proceeds to step 502, where the first media type processor is verified according to a predetermined rule. For example, the predetermined rule may include that a data model cannot have two members with an identical name, and the like. Next, the method 500 proceeds to step 503, where the first media type processor is configured to be associated with the first media type such that the first media type processor can process the first media type. For example, associating the first media type processor with the first media type may be implemented through an XML configuration file. In addition, the first media type processor may also be configured to be associated with a plurality of media types.

Figure 5:
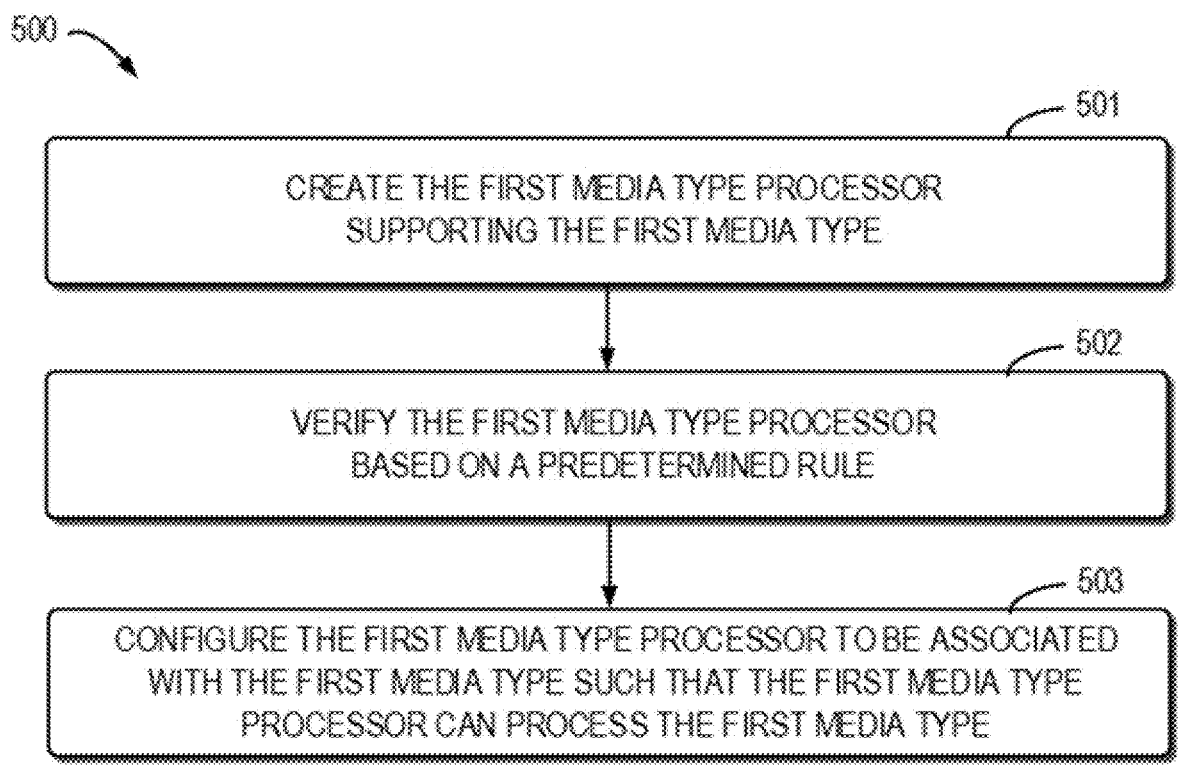
FIG. 5 shows a flow chart of a method 500 for creating a media type processor according to an embodiment of the present disclosure.

It should be understood that FIG. 5 takes the first media type processor as an example to illustrate a method for creating a media type processor, which is only for the purpose of simplifying the depiction. In practice, the method 500 may be applied to create a first media type processor, a second media type processor, and/or a media type processor for any existing or future developed media types. Besides, it should be understood through the method 500 shown in FIG. 5 that, for a new media type, it is only needed to create a media type processor for that media type, without a need for modifying the data model in the existing REST application.

Figure 6:
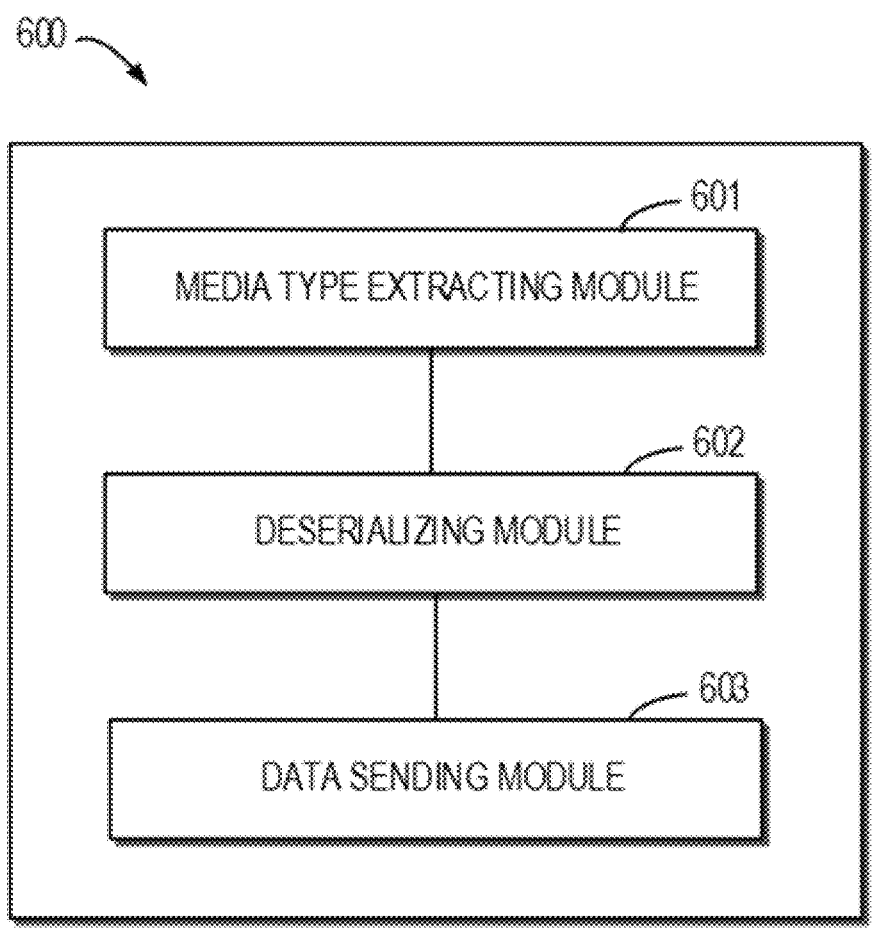
FIG. 6 shows a block diagram of an apparatus 600 for processing a media type in REST software architecture according to an embodiment of the present disclosure.

FIG. 6 shows a block diagram of an apparatus 600 for processing a media type in REST software architecture according to embodiments of the present disclosure. The apparatus 600 comprises: a media type extracting module 601 configured to extract, in a request from a client, a first media type for the request, the request including a message sent to a server; a deserializing module 602 configured to, in response to determining that a first media type processor supporting the first media type exists, convert the message into an instance of a first data model by the first media type processor; and a data sending module 603 configured to send the instance of the first data model to the server.

In some embodiments, the media type extracting module 603 is further configured to: extract, from the request, a second media type specified for a response to the request.

In some embodiments, the apparatus 600 further comprises: a data receiving module configured to receive, from the server, an instance of a second data model returned to the client; a serializing module configured to, in response to determining that a second media type processor supporting the second media type exists, convert the instance of the second data model into a message by the second media type processor; and a response sending module configured to send to the client the response including the message.

In some embodiments, the apparatus 600 further comprises: a data model creating module configured to create the first data model.

In some embodiments, the data model creating module is configured to: mark the first data model with a uniform annotation so as to provide meta-information of the first media type to the first media type processor.

In some embodiments, the uniform annotation comprises at least one of a serializable type, a serializable field, and a serializable entry.

In some embodiments, the apparatus 600 further comprises: a media type processor creating module configured to create the first media type processor supporting the first media type.

In some embodiments, the media type processor creating module is configured to: create a reader so as to enable converting the message of the first media type into the instance of the first data model; and create a writer so as to enable converting the instance of the first model into the message of the first media type.

In some embodiments, the apparatus 600 further comprises: a media type processor verifying module configured to verify the first media type processor based on a predetermined rule.

In some embodiments, the apparatus 600 further comprises: a media type processor registering module configured to configure the first media type processor to be associated with the first media type such that the first media type processor can process the first media type.

For the sake of clarity, some optional modules of the apparatus 600 are not shown in FIG. 6. It should be understood that various features as described above with reference to the method of the present disclosure are likewise applicable to the apparatus 600. Moreover, respective modules of the apparatus 600 may be hardware modules or software modules. For example, the apparatus 600 may be implemented partially or completely with software and/or firmware, e.g., implemented as a computer program product embodied on the computer readable medium. Alternatively or additionally, the apparatus 600 may be partially or completely implemented based on hardware, e.g., implemented as an integrated circuit (IC) chip, an application-specific integrated circuit (ASIC), a system on chip (SOC), a field programmable gate array (FPGA), etc. The scope of the present intention is not limited thereto.

In view of the above, the embodiments of the present disclosure provide a method and apparatus for processing a media type in REST software architecture. The embodiments of the present disclosure can add support to new media types without a need of changing the existing data model, thereby enhancing the development efficiency of web applications.

The embodiments of the present disclosure may be a method, an apparatus and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of processing a media type in representational state transfer (REST) software architecture, comprising:
   extracting, in a request from a client, a first media type for the request, the request including a message sent to a server;
   extracting, from the request, a second media type specified for a response to the request;
   in response to determining that a first media type processor supporting the first media type exists, converting the message into an instance of a first data model by the first media type processor; and
   sending the instance of the first data model to the server,
   wherein the method further comprises, in response to the first media type processor not existing, (i) creating the first data model, (ii) creating the first media type processor supporting the first media type, and (iii) verifying the first media type processor based on a predetermined rule, and wherein creating the first data model comprises marking the first data model with a uniform annotation to provide meta-information of the first media type to the first media type processor.

2. The method according to claim 1, further comprising:
   receiving, from the server, an instance of a second data model returned to the client;
   in response to determining that a second media type processor supporting the second media type exists, converting the instance of the second data model into a message by the second media type processor; and
   sending to the client the response including the message.

3. The method according to claim 1, wherein the uniform annotation comprises at least one of a serializable type, a serializable field, or a serializable entry.

4. The method according to claim 1, wherein creating the first media type processor supporting the first media type comprises:
   creating a reader to enable converting the message of the first media type into the instance of the first data model; and
   creating a writer to enable converting the instance of the first model into the message of the first media type.

5. The method according to claim 1, further comprising:
   configuring the first media type processor to be associated with the first media type to enable the first media type processor to process the first media type.

6. The method according to claim 1, wherein the request from the client is received from the client over a computer network and includes, in a header of the request, both (i) the first media type that specifies a media type of the request and (ii) the second media type that specifies a media type for a response to the request.

7. The method according to claim 1, further comprising:
   receiving, from the server, an instance of a second data model returned to the client;
   in response to determining that a second media type processor supporting the second media type does not exist, converting the instance of the second data model into a message by a default media type processor; and
   sending to the client the response including the message.

8. The method of claim 1, wherein verifying the first media type processor based on the predetermined rule includes confirming that the data model does not have two members with an identical name.

9. The method of claim 8, further comprising providing an XML configuration file that associates the first media type processor with the first media type such that the first media type processor can process the first media type.

10. The method of claim 8, wherein the method is performed by a REST server that is operatively connected to both the client and to the server.

11. An apparatus for processing a media type in representational state transfer (REST) software architecture, comprising a set of processors, memory including machine-executable instructions, and a bus that couples the set of processors to the memory, the set of processors, when executing the machine-executable instructions, is configured to:
   extract, by a media type extracting module, in a request from a client, a first media type for the request, the request including a message sent to a server;
   extract, from the request by the media type extracting module, a second media type specified for a response to the request;
   in response to determining that a first media type processor supporting the first media type exists, convert, by a deserializing module, the message into an instance of a first data model by the first media type processor; and
   send, by a data sending module, the instance of the first data model to the server,
   wherein the set of processors executing the machine-executable instructions is further configured, in response to the first media type processor not existing, (i) to create the first data model and to mark the first data model with a uniform annotation to provide meta-information of the first media type to the first media type processor, (ii) to create, by a media type processor creating module, the first media type processor supporting the first media type, and (iii) to verify, by a media type processor verifying module, the first media type processor based on a predetermined rule.

12. The apparatus according to claim 11, wherein the set of processors executing the machine-executable instructions is further configured to:

receive, by a data receiving module, from the server, an instance of a second data model returned to the client;

in response to determining that a second media type processor supporting the second media type exists, convert, by a serializing module, the instance of the second data model into a message by the second media type processor; and send to the client, by a response sending module, the response including the message.

13. The apparatus according to claim 11, wherein the uniform annotation comprises at least one of a serializable type, a serializable field, or a serializable entry.

14. The apparatus according to claim 11, wherein the media type processor creating module is configured to:

create a reader to enable converting the message of the first media type into the instance of the first data model; and create a writer to enable converting the instance of the first model into the message of the first media type.

* * * * *